(12) United States Patent
Hiraoka et al.

(10) Patent No.: US 6,448,505 B1
(45) Date of Patent: Sep. 10, 2002

(54) SUBSTRATE FOR MOUNTING AN OPTICAL COMPONENT, A METHOD FOR PRODUCING THE SAME, AND AN OPTICAL MODULE USING THE SAME

(75) Inventors: Michiaki Hiraoka, Kizu-cho; Keiko Nakashima, Nara; Koji Takemura, Kyoto, all of (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/696,913

(22) Filed: Oct. 26, 2000

(30) Foreign Application Priority Data

Oct. 29, 1999 (JP) .............................. 11-309815

(51) Int. Cl.$^7$ ................................................. H05K 1/16
(52) U.S. Cl. ....................... 174/260; 174/255; 361/777; 257/774
(58) Field of Search ................................ 174/262, 263, 174/264, 265, 266; 29/852; 257/774, 698; 361/792, 793, 794, 795, 767, 768, 769, 770, 777

(56) References Cited

U.S. PATENT DOCUMENTS

| | | | | |
|---|---|---|---|---|
| 4,602,316 A | * | 7/1986 | Feick | 361/412 |
| 5,471,016 A | * | 11/1995 | Krainer et al. | 174/254 |
| RE35,119 E | * | 12/1995 | Blonder et al. | 257/739 |
| 5,600,101 A | * | 2/1997 | Sakai | 174/261 |
| 5,920,116 A | * | 7/1999 | Umehara et al. | 257/669 |
| 5,940,964 A | * | 8/1999 | Mugiya | 29/840 |
| 6,091,027 A | * | 7/2000 | Hesselbom et al. | 174/255 |
| 6,132,853 A | * | 10/2000 | Noddin | 428/209 |
| 6,185,107 B1 | * | 2/2001 | Wen | 361/803 |
| 6,281,448 B1 | * | 8/2001 | Tsukamoto | 174/260 |

* cited by examiner

Primary Examiner—K. Cuneo
Assistant Examiner—José H. Alcalá
(74) Attorney, Agent, or Firm—Hogan & Hartson, LLP (57) ABSTRACT

A substrate for mounting an optical component includes a first groove formed in a surface of a substrate, a second groove formed in the surface of the substrate, the second groove having a depth greater than the first groove. In the present invention, the first groove and the second groove are related to each other by the following equation, $$(2D \sin \theta)/R \geq C$$

where D denotes a depth of the first groove, θ denotes an angle between a horizontal plane and a slanted surface of the first groove (0°<θ<90°), R=F/E (E denotes an etching rate of a slanted surface of the first groove, F denotes an etching rate of a bottom surface of the groove, C denotes a top opening width of the groove. The first and second grooves are formed by forming a protection film on an entire top surface of the substrate, forming pattern holes corresponding to the first and second grooves in the protection film by a single mask having holes corresponding to the first and second grooves, forming a protection seal on a pattern hold corresponding to one of the first and second grooves, applying anisotropic etching to the substrate through the not-sealed pattern hole to thereby form the other of the first and second grooves, removing the protection seal, forming another protection seal on the groove formed by anisotropic etching, applying anisotropic etching to the substrate through the seal-removed pattern hole to thereby form the remaining one of the first and second grooves; and removing the protection film and the another protection seal from the substrate.

14 Claims, 7 Drawing Sheets

PRIOR ART

SUBSTRATE FOR MOUNTING AN OPTICAL COMPONENT, A METHOD FOR PRODUCING THE SAME, AND AN OPTICAL MODULE USING THE SAME

BACKGROUND OF THE INVENTION

This invention relates to a substrate which is mountable with an optical component such as optical semiconductor device and optical device including optical fiber and lens, a method for producing such a substrate, and an optical module using such a substrate.

In recent years, there has been the demand for larger capacity and more functions of optical communication systems and, accordingly, miniaturization, higher integration and lower production costs have been required for optical devices such as optical transmitters and optical receivers. Particularly, in order to reduce the assembling cost of optical devices, attention has been given to the technique for mounting optical components such as optical semiconductor devices, optical fibers and lenses on a single substrate, in particular, to the so-called passive alignment technique such as an optical hybrid mounting technique, and an alignment-free mounting technique using a silicone platform.

According to the above techniques, an optical axis adjustment and an optical coupling can be established without an aligning operation only by mounting optical components on the substrate with respect to a positioning groove formed in the substrate or mounting optical components in mounting grooves formed in the substrate. This enables a significant reduction in the assembling costs. In order to mount optical components without aligning operation, the optical component mounting grooves formed in the substrate are required to have highly precise dimensions of top opening width and depth. Further, the relative positional relationship between the grooves is required to be precise in the order of sub-micrometers or less than one millionth of a meter.

However, there has been the big problem that a plurality of grooves whose respective depths are different from each other cannot be simultaneously made by a single etching operation for the following reasons.

Figure 8:
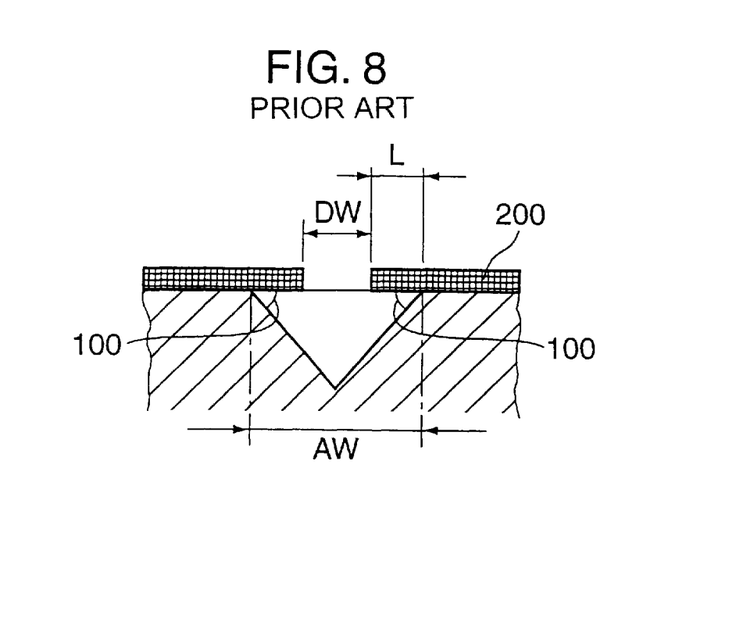
FIG. 8 is a sectional diagram showing a relationship between the undercut amount and the pattern width in a V-shaped groove.

Generally, in the case where a groove is made in a substrate made of a silicon monocrystal by an etching, there will occur an undercut 100 below the non-patterned photoresist layer 200 as shown in FIG. 8. More specifically, in the case that a V-shaped groove is formed in a substrate made of a silicon monocrystal having a (100) surface as a principle surface by anisotropic etching using an alkaline solution (etching solution: KOH (43 vol %) solution, solution temperature 60° C.), an undercut occurs in proportion to the depth of etching as can be seen from a graph of FIG. 9.

Figure 9:
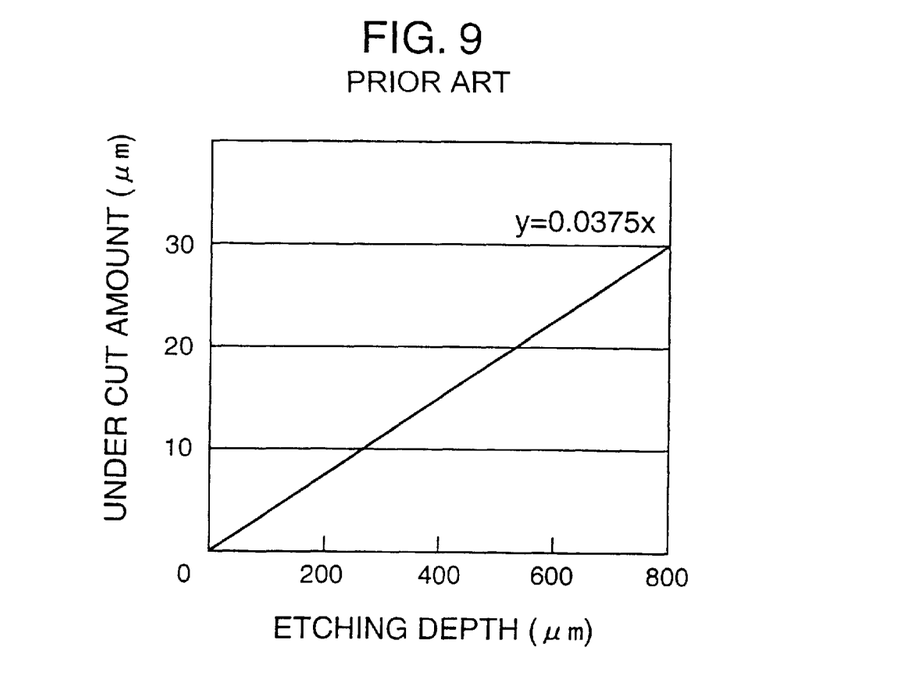
FIG. 9 is a graph showing a relationship between the undercut amount and the depth of etching in anisotropic etching of a silicon monocrystal.

The undercut amount represented by the vertical axis in FIG. 9 means a difference between a designed pattern width and an actual top opening width (V-shaped groove width) of a V-shaped groove after etching. It will be seen from FIG. 8 that the undercut amount (2L) is calculated by subtracting a designed width (DW) of the patterned hole from an actual width (AW) of the V-shaped groove, that is, 2L=AW−DW. To make a groove having a depth of 800 μm, for example, it is necessary to apply etching for approximately 50 hours, and an undercut of about 30 μm occurs during this etching. It means that in the case of making a groove having a final depth of 30 μm, the designed pattern width should be at 0 μm. This is to say that a groove having a width of 30 μm or smaller cannot be practically made. The occurrence of undercuts will make it impossible to form a plurality of grooves having different depths in a single substrate by a single etching.

Further, in the case of making a plurality of grooves having trapezoidal cross sections and different depths to their bottom surfaces, it has been difficult to simultaneously form them by a single etching.

In view of this problem, a substrate for mounting an optical component (hereinafter, referred to as "optical component mounting substrate") which is formed with different depth grooves has been conventionally produced by steps shown in FIGS. 10A to 10E. In order to facilitate the description, in these figures, forming of two V-shaped grooves in a substrate will be described.

Figure 10A:
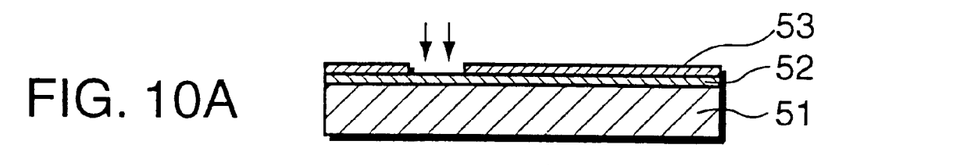
FIGS. 10A to 10E are sectional views showing a conventional method for producing an optical component mounting substrate.

First, as shown in FIG. 10A, a protection film 52 made of a silicon oxide or a silicon nitride is formed on the entire top surface of a substrate 51 made of a silicon monocrystal. The protection film 52 is resistant to an etching solution for etching the substrate 51. Further, a photoresist film 53 is formed on the entire top surface of the protection film 52. Patterning is applied to the photoresist film 53 by photolithography using a photomask for part of a V-shaped groove to be formed in a first etching. Thereafter, the part of the protection film 52 which corresponds to the V-shaped groove is also removed by a silicon oxide etching solution.

Figure 10B:
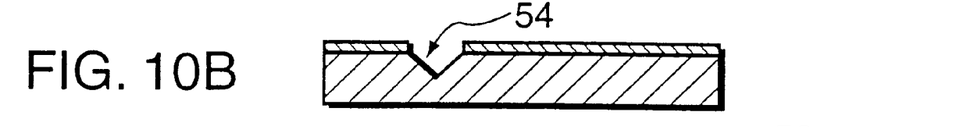

Subsequently, as shown in FIG. 10B, a V-shaped groove 54 is formed by etching the surface part where the substrate 51 is exposed using an etching solution containing sodium hydroxide (NaOH), potassium hydroxide (KOH), tetramethylammonium hydroxide (TMAH), etc.

Figure 10C:
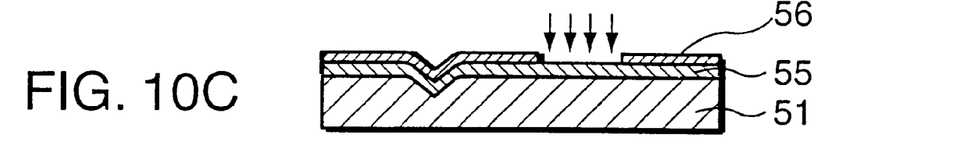

Subsequently, as shown in FIG. 10C, a protection film 55 made of a silicon oxide or a silicon nitride is formed on the entire top surface of the substrate 51 including the V-shaped groove 54 after the protection film 52 is entirely removed, and a photoresist film 56 is formed on the entire top surface of the protection film 55. A photomask for a V-shaped groove to be formed in a second etching is positioned with reference to a marker provided on the substrate 51 to position the photomask, and patterning is applied to the photoresist film 56 by photolithography. Thereafter, the part of the protection film 55 which corresponds to the groove to be formed by the second etching is removed.

Figure 10D:
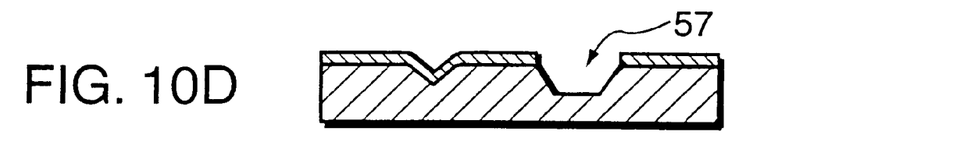
Figure 10E:
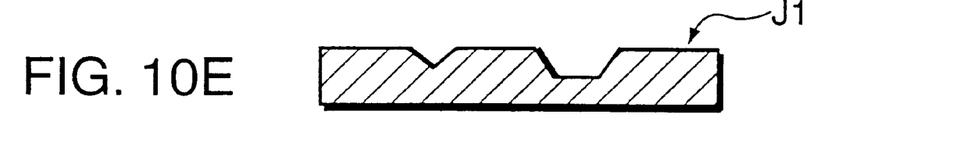

Subsequently, as shown in FIG. 10D, a groove 57 is formed by the same procedure as the V-shaped groove 54, and the protection film 55 is finally removed to produce an optical component mounting substrate J1 formed with the grooves as shown in FIG. 10E.

In the above-mentioned conventional method, it will be apparent that high-precision patterning cannot be accomplished for the second formed photoresist film 56 and protection film 55 because of the presence of the V-shaped groove 54 formed in the first etching. In view of this problem, Japanese Unexamined Patent Publication No. 3-132031 proposes making of a plurality of V-shaped grooves having different depths by applying patterning only to the top flat surface of the substrate. However, this proposal cannot successfully eliminate the likelihood that the position of a second-placed photomask is different from that of a first-placed photomask, which causes undesired displacement of V-shaped grooves having different depths.

Specifically, a reference marker is provided at a specified position of the substrate, e.g., at an end of the substrate. In the first and second etchings, the photomask is arranged over the substrate by positioning a marker provided on the photomask with respect to the reference marker on the substrate. The photoresist film or protection film is likely to have an irregular thickness around the previously-formed groove, which makes it difficult to distinguish the marker provided on the substrate. Further, an exposure device, e.g., a contact-type exposure device, is usually incapable of positioning in the order of sub-microns.

Even if the above problems could be cleared, the substrate is liable to be warped due to a heat history since the positioning marker provided on the substrate have been subjected to various heat treatment processes. This warping causes shift of the positioning marker.

It will be seen to be extremely difficult to make the marker provided on the photomask agree with the marker provided on the substrate. Accordingly, in the above-mentioned conventional method, the greater the number of grooves having different depths becomes, the greater the number of placing photomask becomes, which consequently accumulates displacements of markers, and finally results in the unacceptable disagreement among grooves.

SUMMARY OF THE INVENTION

It is an object of the present invention to provide a substrate for mounting an optical component, a method for producing an optical component mounting substrate, and an optical module which are free from the problems residing in the prior art.

According to the invention, a substrate for mounting an optical component is formed with a first groove and a second groove at least. The second groove has a depth greater than the first groove. The first groove and the second groove have a relationship with each other represented by the following equation, $$(2D \sin \theta)/R \geq C$$

where D denotes a depth of the first groove, θ denotes an angle between a horizontal plane and a slanted surface of the first groove (0°<θ<90°), R=F/E (E denotes an etching rate of a slanted surface of the first groove, F denotes an etching rate of a bottom surface of the groove, C denotes a top opening width of the groove.

The first groove and the second grooves are formed by forming a protection film on an entire top surface of the substrate, forming pattern holes corresponding to the first and second grooves in the protection film by a single mask having holes corresponding to the first and second grooves, forming a protection seal on a pattern hole corresponding to one of the first and second grooves, applying anisotropic etching to the substrate through the not-sealed pattern hole to thereby form the other of the first and second grooves, removing the protection seal, forming another protection seal on the groove formed by anisotropic etching, applying anisotropic etching to the substrate through the seal-removed pattern hole to thereby form the remaining one of the first and second grooves, and removing the protection film and the another protection seal from the substrate.

The inventive substrate is mounted with an optical component to produce an inventive optical module.

Thus, an optical component mounting substrate formed with a plurality of grooves having different sizes and depths can be formed to have highly precisely dimensions. Further, optical devices can be accurately mounted on the substrate, thereby enabling production of an optical module having an excellent performance.

These and other objects, features and advantages of the present invention will become more apparent upon a reading of the following detailed description and accompanying drawings.

DETAILED DESCRIPTION OF THE PREFERRED EMBODIMENT OF THE INVENTION

Inventors of this invention have performed trial and error to produce an optical component mounting substrate having grooves whose depths are different from one another at a reduced cost and accurately. Finally, they have found out the fact that to maintain the displacement of a plurality of grooves within 1 μm or smaller, the plurality of grooves having the relationship defined by Equation (1) may be formed by a single etching, but the plurality of grooves having the relationship defined by Equation (2) must be formed by separate etchings:

$$(2D \sin \theta)/R < C \quad (1)$$

$$(2D \sin \theta)/R \geq C \quad (2)$$

wherein D denotes a depth of the deepest one among the plurality of grooves, θ denotes an angle between a horizontal plane and a slanted surface of the deepest groove (0°<θ<90°), R=F/E (E denotes an etching rate of the slanted surface of the deepest groove, F denotes an etching rate of the bottom surface of the deepest groove, and C denotes a top opening width of another one among the plurality of grooves. In the case of a silicon monocrystal substrate having a (100) surface as a principle surface, E denotes an etching rate of {111} surface, and F denotes an etching rate of (100) surface.

Further, the inventor has invented the novel method which can reduce the number of photomask placements even if a plurality of etching operations are required. Specifically, after patterning of a plurality of grooves having a different depths is executed by a single photomask, etching-resistant seal is formed on groove forming areas except those where arbitrary grooves are to be formed in a first etching operation. Thereafter, the arbitrary grooves are formed by the first etching operation, and then the following steps (A) and (B) are performed at least once:

(A) Step of forming etching-resistant seals on the already formed grooves and/or groove forming areas except those where arbitrary grooves are to be formed in next etching operation; and (B) Step of forming the remaining one or more V-shaped grooves by anisotropic etching.

Figure 1:
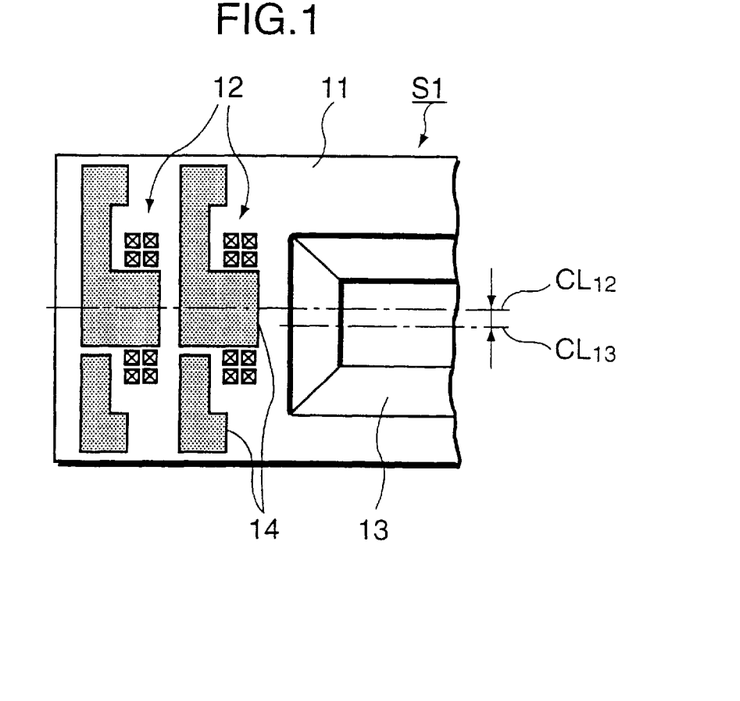
FIG. 1 is a plan view showing a part of an optical component mounting substrate according to an embodiment of the invention.

Next, preferred embodiments of the invention will be described. Referring to FIG. 1, an optical component mounting substrate S1 according to an embodiment of the invention includes a substrate 11 made of a silicon monocrystal to which anisotropic etching is applicable, small and shallow V-shaped grooves 12 formed in the substrate 11 and having a width of, e.g., 10 μm used as positioning markers when optical semiconductor devices (not shown) such as light emitters and light detectors are mounted, and a wider and deeper V-shaped groove 13 formed in the substrate 11 and having a width of, e.g., 1520 μm for mounting a fiber stub, a lens, or the like as an optical waveguide for optical coupling with the optical semiconductor devices, and electrode patterns 14 provided on the substrate 11 for electrically connecting the optical semiconductor devices with external circuits.

The positioning V-shaped groove 12 and the optical component mounting V-shaped groove 13 have the following relationship:

$$(2D \sin \theta)/R \geq C$$

wherein D denotes a depth of the V-shaped groove 13, θ denotes an angle between a horizontal plane and a slanted surface of the V-shaped groove 13 (0°<θ<90°), R=F/E (E denotes an etching rate of the slanted surface of the V-shaped groove 13, F denotes an etching rate of the bottom surface of the V-shaped groove 13, and C denotes a top opening width of the V-shaped groove 12. The displacement of the center line $CL_{13}$ of the V-shaped groove 13 with respect to the center line $CL_{12}$ of the V-shaped groove 12 is equal or smaller than 1 μm.

Comparing to a conventional optical component mounting substrate provided with an electrode marker which is formed at the same time as forming an electrode pattern, the inventive optical component mounting substrate S1 is formed with the V-shaped grooves 12 serving as reference marker. Accordingly, the edge of the marker has a satisfactory linearity and can be highly precisely detected.

With reference to FIGS. 2A to 2E, an exemplary production method of producing the optical component mounting substrate shown in FIG. 1 will be described.

Figure 2A:
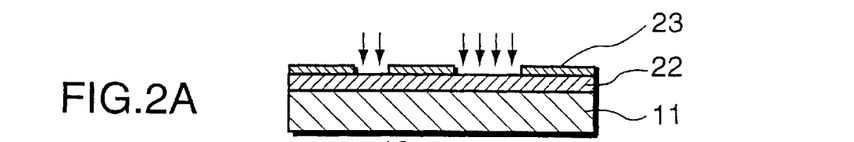
FIGS. 2A to 2E are sectional views showing an optical component mounting substrate production method according to the embodiment of the invention.

First, as shown in FIG. 2A, a protection film 22 made of a silicon oxide or a silicon nitride is formed on an entire top surface of the substrate 11 made of a silicon monocrystal, and a photoresist film 23 is successively formed on the protection film 22. Subsequently, the photoresist film 23 is patterned by photolithography using a photomask formed with openings for the V-shaped grooves 12 to be formed in a first etching operation and an opening for the V-shaped groove 13 to be formed in a second etching operation.

Figure 2B:
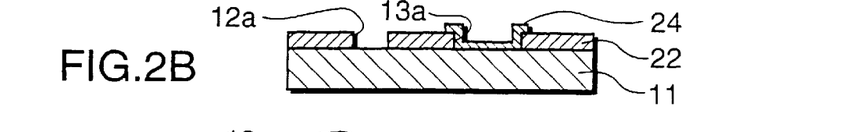

Subsequently, as shown in FIG. 2B, the protection film 22 is patterned by a silicon oxide etching solution, thereby forming a hole 12a corresponding to the V-shaped groove 12 and a hole 13a corresponding to the V-shaped groove 13. Thereafter, an etching-resistant seal 24 made of a silicon oxide or a silicon nitride is formed over the hole 13a to protect only the area of the substrate 11 that corresponds to the V-shaped groove 13 to be formed in the second etching.

Figure 2C:
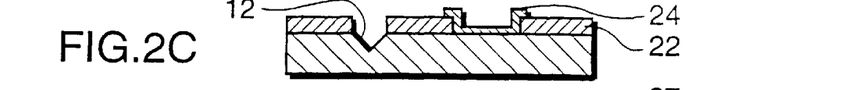
Figure 2D:
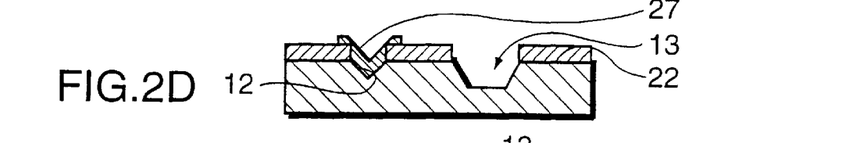

Subsequently, as shown in FIG. 2C, anisotropic etching is applied to an exposed part of the substrate 11 in the hole 12a using an etching solution containing a sodium hydroxide solution, a potassium hydroxide solution or the like, thereby forming a V-shaped groove 12. In this way, the first etching is performed.

Subsequently, as shown in FIG. 2C, a protection seal 27 made of silicon oxide or silicon nitride is formed over the V-shaped groove 12, and the protection seal 24 is removed. An exposed part of the substrate 11 is in the hole 13a is removed by the same way as the V-shaped groove 12 is formed. In this way, the second etching is accomplished.

Figure 2E:
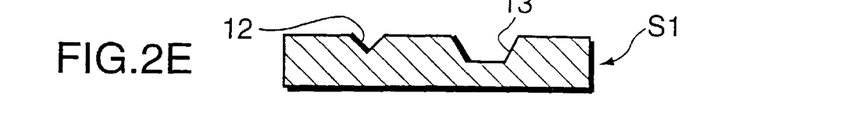

By removing the protection film 22, finally, the optical component mounting substrate S1 formed with the V-shaped grooves 12 and 13 is produced as shown in FIG. 2E.

According to an actually performed example where V-shaped grooves having a top opening width of 10 μm and a V-shaped groove having a top opening width of 1520 μm are formed in a substrate made of silicon monocrystal by the above-described inventive production method, etching was applied for 39 hours to form the deeper V-shaped groove 13, an undercut amount during this etching was 21 μm and an actual measurement value of a relative displacement was 0.6 μm.

It should be noted that if the V-shaped groove 12 and the V-shaped groove 13 has the following relationship:

$$(2D \sin \theta)/R < C$$

it may be possible to form the V-shaped groove 12 and the V-shaped groove 13 in the first etching without forming the protection seal 24.

Also, it may be preferable to form the shallow V-shaped groove 12 prior to the forming of the deep V-shaped groove 13 because the protection seal for the shallow V-shaped groove 12 can be more precisely formed, with the result that the V-shaped grooves 12 and 13 can be highly precisely formed.

Figure 3:
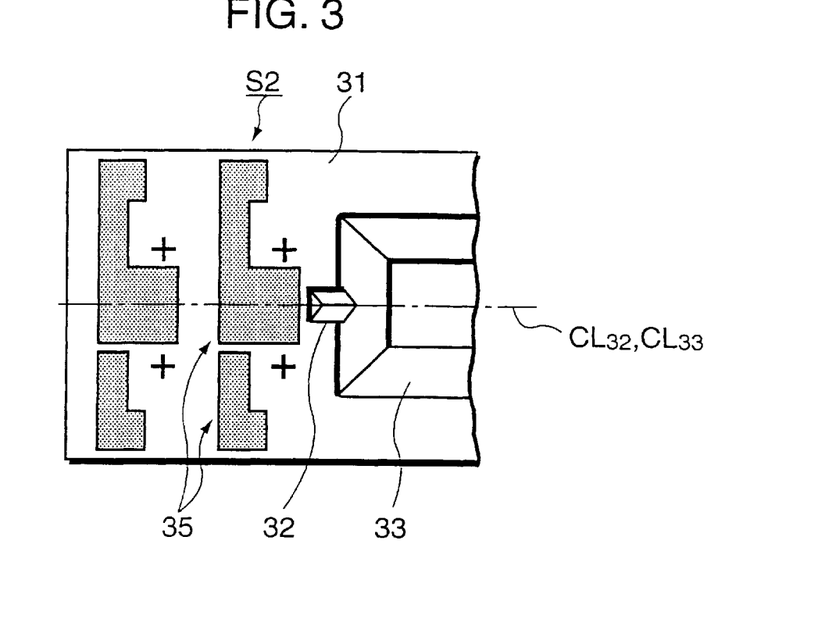
FIG. 3 is a plan view showing a part of an optical component mounting substrate according to another embodiment of the invention.

Next, an optical component mounting substrate according to another embodiment of the invention will be described. As shown in FIG. 3, an optical component mounting substrate S2 includes a small and shallow V-shaped groove 32 having a width of, e.g., 25 μm for ensuring an optical path at an optically coupled portion, and a larger and deeper V-shaped groove 33 continuous with the V-shaped groove 32, having a width of, e.g., 1520 μm and used to mount a fiber stub as an optical waveguide. The V-shaped groove 32 and the V-shaped groove 33 have the same relationship as the foregoing embodiment, that is:

$$(2D \sin \theta)/R \geq C$$

Also, the optical component mounting substrate S2 is produced in the method similar to the foregoing embodiment, that is, the method shown in FIG. 2. In this embodiment, the center line $CL_{32}$ of the V-shaped groove 32 and the center line $CL_{33}$ of the V-shaped groove 33 can be aligned within a desired allowance of 1 μm or smaller.

Figure 4:
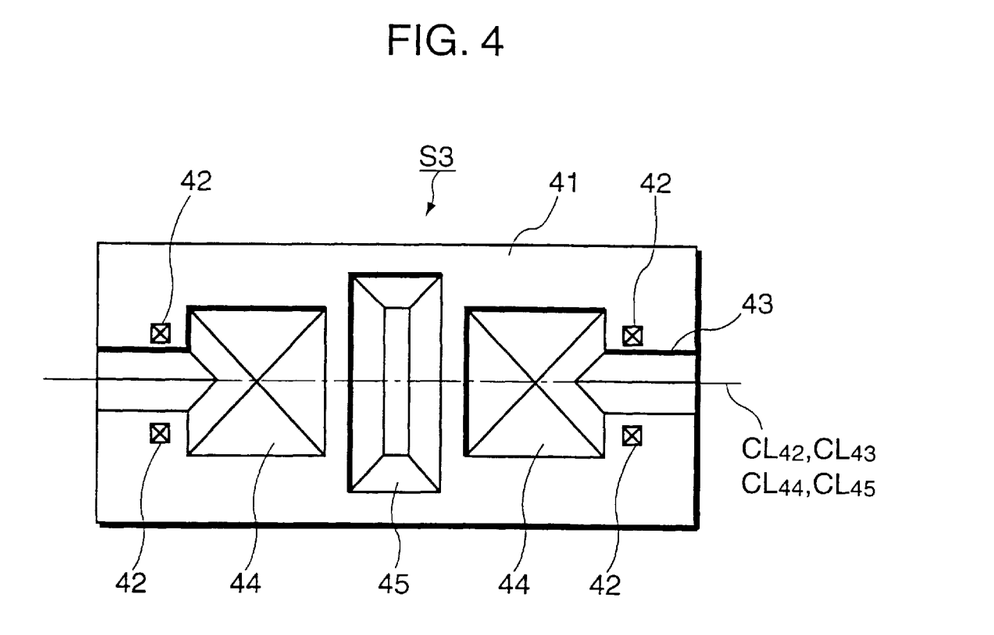
FIG. 4 is a plan view showing an optical component mounting substrate according to still another embodiment of the invention.

Next, an optical component mounting substrate according to still another embodiment of the invention is described with reference to FIG. 4. An optical component mounting substrate S3 shown in FIG. 4 is formed with V-shaped grooves 42 serving as positioning marker, V-shaped grooves 43 for mounting optical fiber, and V-shaped grooves 44 and 45 for mounting optical devices constituting a lens system for optical coupling. The group of V-shaped grooves 42 and 43 and the group of V-shaped grooves 44 and 45 have the same relationship as the foregoing embodiments, that is:

$$(2D \sin \theta)/R \geq C.$$

Also, the optical component mounting substrate S3 is produced in the method similar to the foregoing embodiment, that is, the method shown in FIG. 2. In this embodiment, the respective center lines $CL_{42}$, $CL_{43}$, $CL_{44}$, $CL_{45}$ of the V-shaped grooves 42 to 45 can be aligned within the allowable range of 1 μm or smaller. Accordingly, optical devices such as optical fiber, ball lens, isolator and filter can be aligned accurately without requiring active adjustment of optical axes.

Figure 5A:
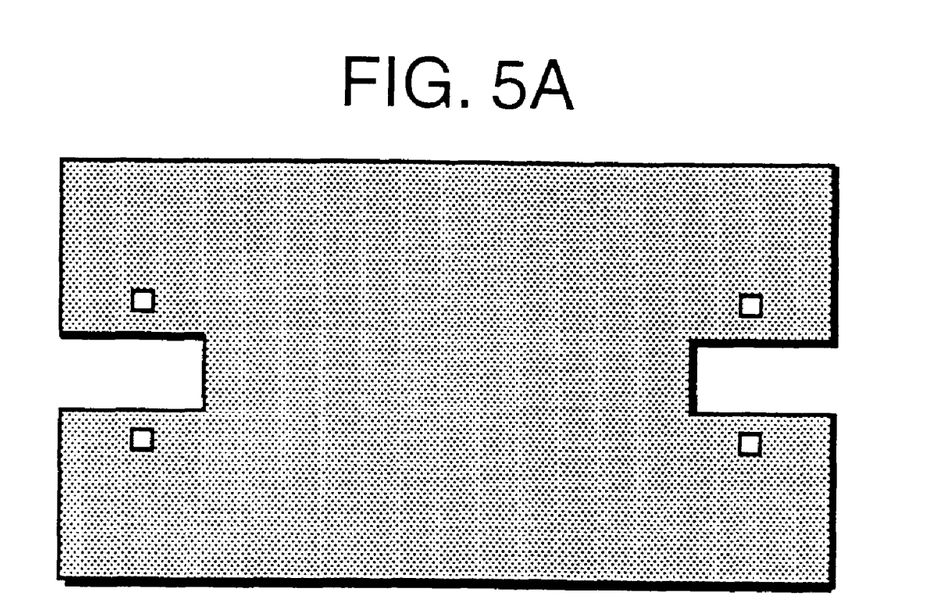
FIGS. 5A and 5B are plan views showing photomask patterns for forming protection seals in the production of the optical component mounting substrate of FIG. 4, respectively.
Figure 5B:
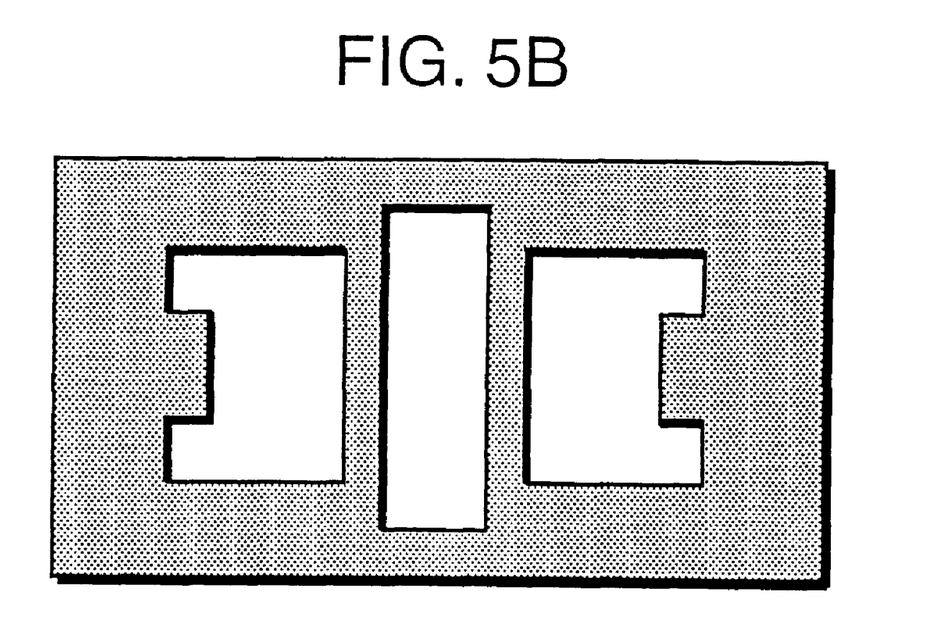

FIGS. 5A and 5B show photomasks used to form protection seals, wherein FIG. 5A shows a photomask used to form a protection seal for the V-shaped grooves 42, 43, and FIG. 5B shows a photomask used to form a protection seal for the V-shaped grooves 44, 45.

First, pattern holes for the V-shaped grooves 42 to 45 are formed in a photoresist film by a single photomask, and then formed in a protection film. The V-shaped grooves 42 and 43 are formed in the first etching while protecting the pattern holes for the V-shaped grooves 44 and 45 by protection seals which are formed by using the photomask of FIG. 5B. Further, in the second etching, the V-shaped grooves 44 and 45 are formed while protecting the pattern holes for the V-shaped grooves 42 and 43 by protection seals which are formed by using the photomask of FIG. 5A.

Figure 6A:
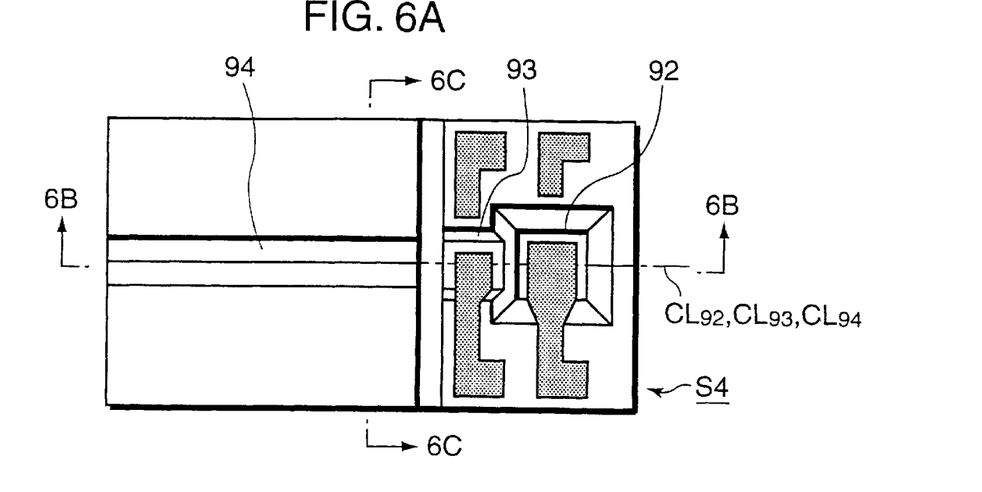
FIG. 6A is a plan view showing an optical component mounting substrate according to further embodiment of the invention.
Figure 6B:
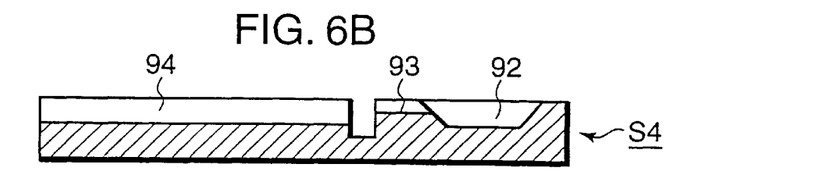
FIG. 6B is a sectional view taken along the line 6B—6B in FIG. 6A.
Figure 6C:
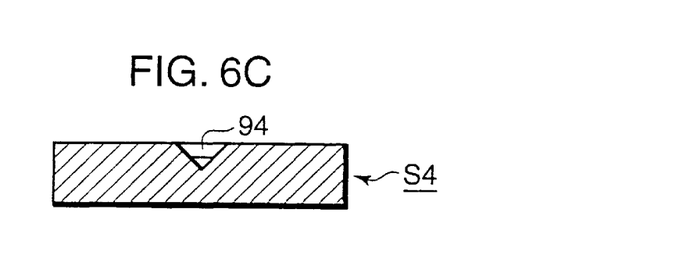
FIG. 6C is a sectional view taken along the line 6C—6C in FIG. 6A.

FIGS. 6A to 6C show an optical component mounting substrate according to further embodiment of the invention. An optical component mounting substrate S4 includes a groove 92 for mounting a photodiode for monitoring, a groove 93 for mounting a semiconductor laser, and a V-shaped groove 94 for mounting an optical fiber. The grooves 92 and 93 have a trapezoid shape while the groove 94 has a v-shape. Also, the groove 92, the groove 93, and the groove 94 have the same relationship with one another as the foregoing embodiments, that is:

$$(2D \sin \theta)/R \geq C.$$

Also, the optical component mounting substrate S4 is produced in the method similar to the foregoing embodiment, that is, the method shown in FIG. 2. In this embodiment, however, anisotropic etching is performed three times. Specifically, a first etching is performed for forming the V-shaped groove 94, a second etching is performed for forming the groove 93, and a third etching is performed for forming the groove 92.

Figure 6D:
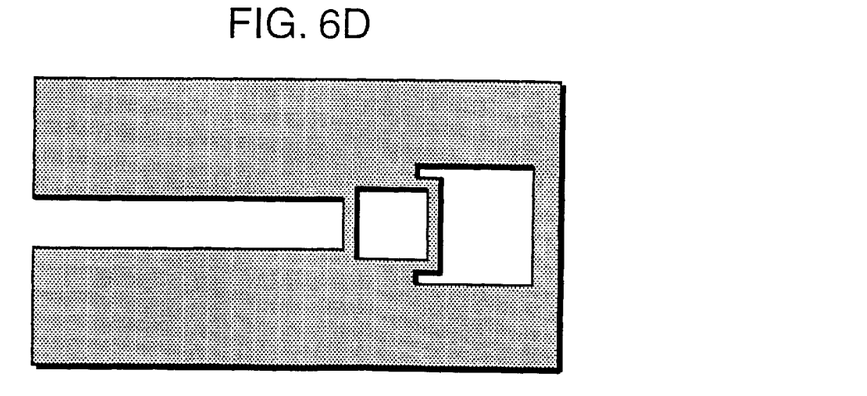
FIG. 6D is a plan view showing a photomask for the substrate of FIG. 6A.

FIG. 6D shows a photomask for forming pattern holes corresponding to the grooves 92 to 94 in a photoresist film in the initial stage.

The precision in the depth of the grooves 92, 93 and the precision of their positions with respect to the V-shaped groove 94 are required to be in the order of sub-microns because these grooves are used for positioning the optical coupling system with respect to height direction and horizontal direction. The optical component mounting substrate S4 produced by the inventive method can satisfy this requirement because the respective center lines $CL_{92}$, $CL_{93}$, $CL_{94}$ of the grooves 92 to 94 are aligned within the allowable range of 1 μm or smaller.

An optical coupling system free from an active adjustment of optical axes can be realized only by mounting a semiconductor laser, a photodiode for monitoring in the grooves 93 and 92 having different depths and widths from the V-shaped groove 94 for mounting an optical fiber.

Figure 7:
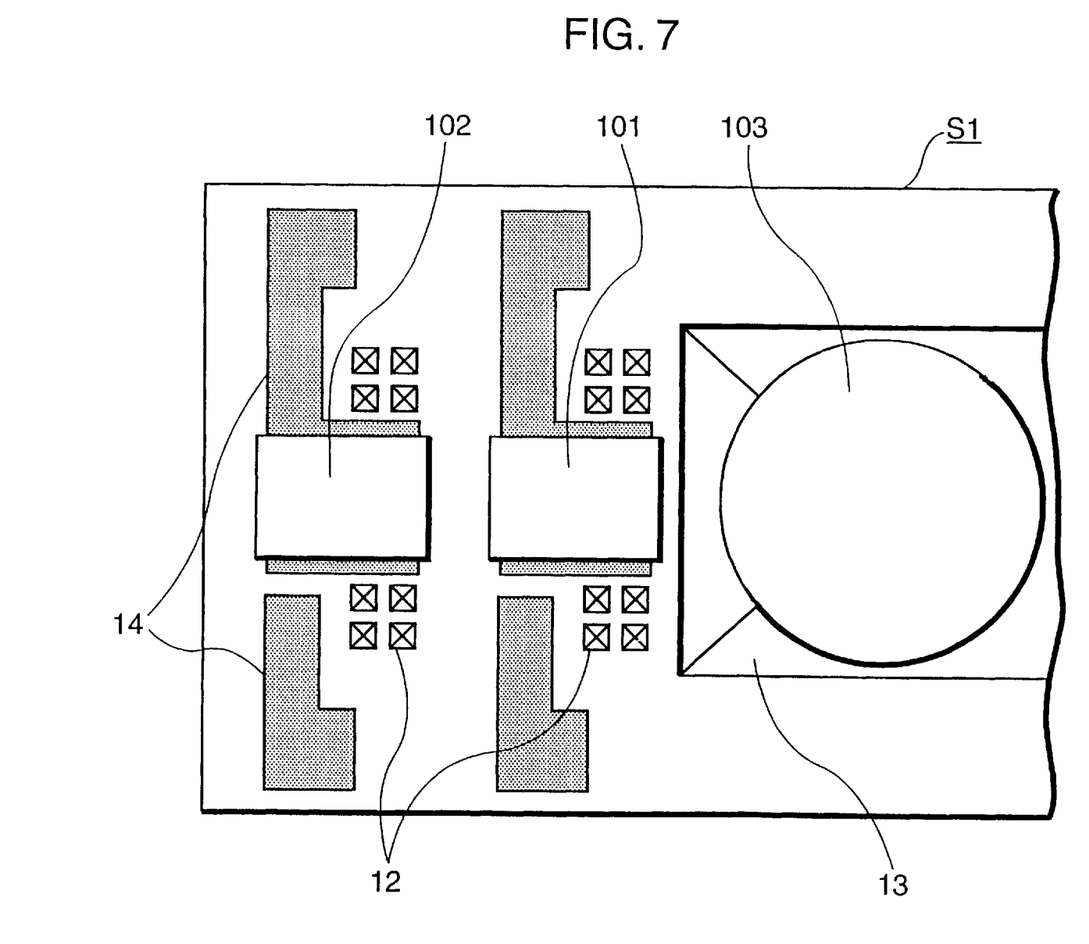
FIG. 7 is a plan view showing an optical module according to still further embodiment of the invention, using the optical component mounting substrate shown in FIG. 1.

An optical module according to still further embodiment of the invention will be described with reference to FIG. 7. The optical module shown in FIG. 7 is assembled as follows. First, using the substrate S1 described with reference to FIG. 1, a semiconductor laser 101 and a photodiode for monitoring 102 are soldered and fixed by means of a mounting device such as flip-chip bonder while observing positioning markers. At this time, an Au—Sn alloy solder provided on the electrodes 14 are used as the fixing solder. Further, a collimating lens 103 or the like is mounted in the deeper groove 13 for mounting an optical component. As described above, since the positioning markers 12 and the deeper V-shaped groove 13 are so formed as to have a highly precise relative positional relationship, all optical axes can be aligned only by mounting the optical components on a desirably designed substrate. Thus, a highly efficient optical coupling system can be constructed.

It should be noted that the invention is applicable to optical component mounting substrates formed with two or more grooves which have the above-mentioned particular relationship between them.

As described above, an inventive optical component mounting substrate is formed with a first groove and a second groove in a surface thereof at least. The second groove has a depth greater than the first groove, and the first groove and the second groove have a relationship with each other represented by the following equation, $$(2D \sin \theta)/R \geq C$$

where D denotes a depth of the first groove, θ denotes an angle between a horizontal plane and a slanted surface of the first groove (0°<θ<90°), R=F/E (E denotes an etching rate of a slanted surface of the first groove, F denotes an etching rate of a bottom surface of the groove, C denotes a top opening width of the groove.

The first and second grooves are formed by forming a protection film on an entire top surface of the substrate; forming pattern holes corresponding to the first and second grooves in the protection film by a single mask having holes corresponding to the first and second grooves; forming a protection seal on a pattern hole corresponding to one of the first and second grooves; applying anisotropic etching to the substrate through the not-sealed pattern hole to thereby form the other of the first and second grooves; removing the protection seal; forming another protection seal on the groove formed by anisotropic etching; applying anisotropic etching to the substrate through the seal-removed pattern hole to thereby form the remaining one of the first and second grooves; and removing the protection film and the another protection seal from the substrate.

It may be preferable to form the first groove before the second groove.

One of the first groove and the second groove may be formed to have either a V-shape or a trapezoid shape in section.

The first groove and the second groove both may formed to have a V-shape in section. In this case, the first groove may serve as a positioning marker.

Alternatively, the first groove and the second groove both may formed to have a trapezoid shape in section.

An inventive optical module is provided with the inventive substrate and an optical component mounted on the second groove. It may be possible to mount another optical component on the first groove. Alternatively, the first groove may be used as a positioning marker.

Accordingly, a plurality of grooves having different sizes and depths can be formed to have highly precisely dimensions. Thus, unlike the prior art, a cumbersome operation such as a complicated step of aligning the masks can be eliminated. This remarkably improves a total mounting precision of optical semiconductor devices or like optical components provided on the substrate, enabling provision of an optical module having an excellent performance.

This application is based on patent application No. 11-309815 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A substrate for mounting an optical component, comprising:
   a first groove formed in a surface of a substrate made of a silicon monocrystal;
   a second groove formed in the surface of the substrate, the second groove having a depth greater than the first groove;
   wherein the first groove and the second groove are related by the equation, $$(2D \sin \theta)/R \geq C$$

where D denotes a depth of the second groove, θ denotes an angle between a horizontal plane and a slanted surface of the second groove (0°<θ<90°), R=F/E, where E denotes an etching rate of a slanted surface of the second groove when anisotropically etched by alkaline solution, F denotes an etching rate of a bottom surface of the second groove when anisotropically etched by alkaline solution, and C denotes a top opening width of the first groove.

2. A substrate according to claim 1, wherein one of the first groove and the second groove has either a V-shape or a trapezoid shape in section.

3. A substrate according to claim 2, wherein the first groove and the second groove both have a V-shape in section.

4. A substrate according to claim 3, wherein the first groove serves as a positioning marker.

5. A substrate according to claim 2, wherein the first groove and the second groove both have a trapezoid shape in section.

6. The substrate for mounting an optical component according to claim 1, wherein the first and second grooves are formed by the steps of:
   forming a protection film on an entire top surface of the substrate;
   forming pattern holes corresponding to the first and second grooves in the protection film by a single mask having holes corresponding to the first and second grooves;
   forming a protection seal on a pattern hole corresponding to one of the first and second grooves;
   applying anisotropic etching to the substrate through the not-sealed pattern hole to thereby form the other of the first and second grooves;
   removing the protection seal;
   forming another protection seal on the groove formed by anisotropic etching;
   applying anisotropic etching to the substrate through the seal-removed pattern hole to thereby form the remaining one of the first and second grooves; and
   removing the protection film and the another protection seal from the substrate.

7. The substrate for mounting an optical component according to claim 1, wherein the first groove has a V-shape in cross-section.

8. The substrate for mounting an optical component according to claim 1, wherein the second groove has a V-Shape in cross-section.

9. The substrate for mounting an optical component according to claim 1, wherein the displacement between the center line of the first groove and the center line of the second groove is less than about 1 μm.

10. The substrate for mounting an optical component according to claim 1, wherein the opening of the first groove is less than about 10 μm.

11. The substrate for mounting an optical component according to claim 1, wherein the undercut of the second groove is less than about 30 μm.

12. The substrate for mounting an optical component according to claim 11, wherein the undercut of the second groove is less than about 21 μm.

13. The substrate for mounting an optical component according to claim 12, wherein the silicon monocrystal is capable of being anisotropically etched.

14. A substrate for mounting an optical component, comprising:
   a first v-shaped groove formed in a surface of a substrate;
   a second v-shaped groove formed in the surface of the substrate, the second groove having a depth greater than the first groove;
   wherein the first groove and the second groove are related by the equation, $$(2D \sin \theta)/R \geq C$$

where D denotes a depth of the second groove, θ denotes an angle between a horizontal plane and a slanted surface of the second groove (0°<θ<90°), R=F/E, where E denotes an etching rate of a slanted surface of the second groove when anisotropically etched by alkaline solution, F denotes an etching rate of a bottom surface of the second groove when anisotropically etched by alkaline solution, and C denotes a top opening width of the first groove, and
   wherein the displacement between the center line of the first groove and the center line of the second groove is less than about 1 μm.

* * * * *